July 21, 1931.  A. J. WEATHERHEAD, JR  1,815,603
COVER FOR RECEPTACLES
Filed Oct. 27, 1926
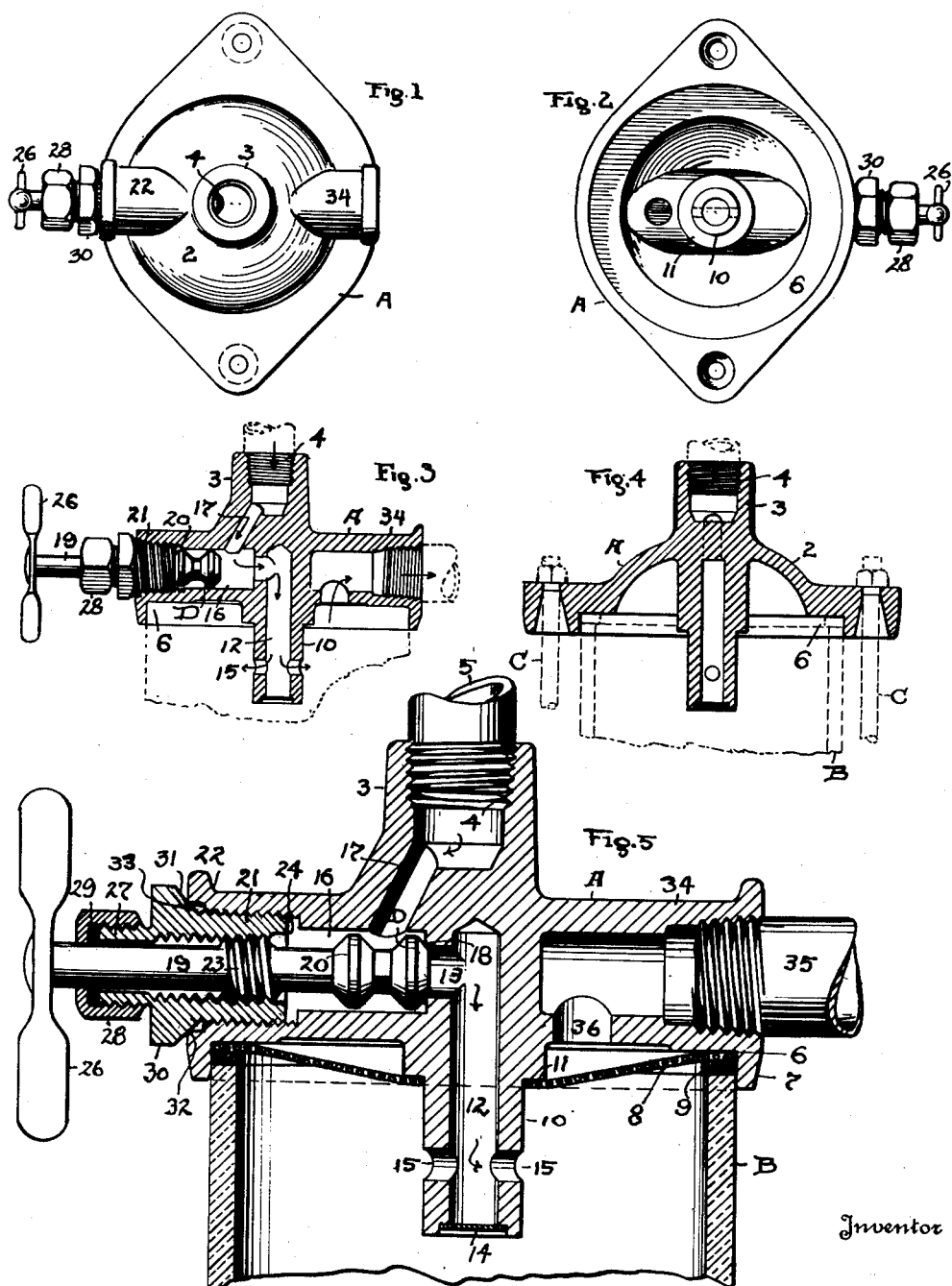

Patented July 21, 1931

1,815,603

UNITED STATES PATENT OFFICE

ALBERT J. WEATHERHEAD, JR., OF CLEVELAND, OHIO

COVER FOR RECEPTACLES

Application filed October 27, 1926. Serial No. 144,626.

This invention pertains to an improvement in strainer covers, and the object of the invention in general is to provide a strainer cover, having a valve therein adapted to control the flow of liquid through the strainer. More specific objects are embodied in the construction of the valve, in its detachable connection with the cover, and in the means provided for preventing leakage from the openings and passages in the cover when the main valve is either open or closed.

In the accompanying drawings Fig. 1 is a top view of the cover and valve, and Fig. 2 is a bottom view of the cover. Fig. 3 is a sectional view of the cover and a side elevation of the valve in an open position therein. Fig. 4 is a sectional view of the cover in a plane at right angles to Fig. 3. Fig. 5 is a sectional view on an enlarged scale of a strainer bowl and a valved cover constructed according to my invention.

The invention comprises a cover A having a round dome 2 surmounted by a hub or short extension 3 in which a screw-threaded opening 4 is formed to permit a supply pipe 5 to be connected thereto. In practice this pipe supports the cover and strainer in a suspended position, and the strainer bowl or receptacle B is detachably secured to cover A by tie rods C or any other suitable fastening means. The bottom of cover A is formed with a flat annular depression 6 bordered by a flange 7, within which a flat screen or strainer member 8 may be seated, together with a resilient gasket 9 against which the upper edge of receptacle B may be pressed with sealing effect. A tubular stem 10 extends downwardly from dome 2, and the screen or strainer member 8 is sleeved over this stem and seated against a flat annular shoulder 11 formed by an enlargement of the stem. The lower end of the central passage 12 in stem 10 is closed by an inset disk 14, but side openings 15—15 provide outlets for passage 12 which extends upwardly and is provided with a lateral intake orifice 13 axially in line with a horizontal bore and valve chamber 16 in cover A. An inclined bore or opening 17 extends from chamber 16 to pipe opening 4, and the flow of liquid is through orifice 13 which has a sharp annular seating edge and entrance 18 adapted to be engaged by a beveled valve member D. This main seat 18 for the valve member is formed in the cover itself, at the base or inner end of valve chamber 16, and the valve member has a round stem 19 which is formed with a beveled enlargement 20 adjacent valve member D, and which enlargement 20 serves as an auxiliary valve or stop member adapted to seal chamber 16 at its outer end where stem 19 passes into a supporting nut 21. This nut is screwed into the outer end of an internally threaded boss 22 on cover A, and it is provided with a screw-threaded bore in which the coarse screw-threads 23 on valve stem 19 are adapted to operate. The inner end of nut 21 is finished with a sharp angular corner edge 24 surrounding stem 19 to permit the beveled face of auxiliary valve member 20 to seat against it and seal the bore and chamber at this point when the main valve is opened by screwing the valve stem outwardly through nut 21, a handle 26 being provided at the outer end of the stem to rotate the stem. A reduced screw-threaded extension 27 on the outer end of nut 21 supports a screw cap 28 containing a packing ring 29 to seal the joint where the smooth round part of stem 19 passes therethrough to handle 26. Nut 21 is also formed with a hexagonal head or enlargement 30 having a beveled face 31 which is adapted to be forced into tight engagement with an angular sharp-edged seat 32 which is produced in the end face of boss 22 by forming a shallow recess 33 at the entrance of the screw-threaded bore for the nut in said boss. When the strainer is in use the main valve is open, and it is especially desirable to seal all the joints open to the passage of the liquid. With a cover structure as described the beveled face 31 on nut 21 seals the joint between the nut and cover, and the auxiliary valve or beveled enlargement 20 on stem 19 seals the joint between the stem and the inner end of the nut, and each seal is affected by a beveled face forced against a sharp angular corner edge. Closing of the main valve seat also involves forced engagement of a beveled surface against a sharp angular corner edge. In lieu of using a sharp corner in boss 22 and a beveled face 31 on nut 21 I may use two tapered threads or straight and tapered threads to produce a tight joint for the nut.

Cover A may also embody a chambered boss 34 having a screw-threaded connection for a pipe 35, and the bottom of the cover may be provided with an opening 36 above strainer member 8 and which opening serves as an outlet for receptacle B.

What I claim, is:

1. In a member with a recessed seat at its bottom an intake connection at the top of said member and a tubular outlet part depending from its bottom within the area encircled by said seat a communicating passage between inlet and outlet including a valve chamber and a main valve seat, the side of said member having a screw-threaded opening opposite said valve chamber and formed with a sharp border edge at the entrance of said opening, a nut within said screw-threaded opening having a beveled enlargement engaging said sharp border edge and provided with a screw-threaded bore having a sharp-edged entrance at the inner end of the nut, a main valve within said chamber adapted to engage said main valve seat having a screw-threaded operating stem extending through said nut, and an auxiliary valve member upon said stem spaced a substantial distance from the end thereof and adapted to seat against the sharp-edged entrance for the stem at the inner end of the nut when the main valve is opened.

2. In a member having a recessed seat, a vertical inlet fluid passage, at the top of said member, a horizontal valve chamber open to one side of said member above said recessed seat, an inclined communicating passage between said valve chamber and said fluid passage, an outlet fluid passage communicating with said chamber and centrally aligned with respect to the seat of said member, a valve seat in said chamber, a sealing nut screwed into one end of said chamber, and a valve member engaging said valve seat having an operating stem screw-engaged with and extending through said nut.

3. In a member having a recessed seat at the bottom thereof, a tubular portion depending from the bottom thereof, centrally with respect to the recessed seat, a horizontal valve chamber within said member opening into one side of said member and formed with a valve seat opening into said tubular portion, a nut secured within the outer end of said valve chamber, a valve member within said chamber adapted to engage said valve seat, a valve stem screw connected with and extending through said nut, and means at the top of the member adapted to permit a pipe to be connected therewith in open communication with said valve chamber.

4. In a member having a recessed bottom, and adapted to be used as a cover for a receptacle, a screw-threaded vertical extension at the top of said member, a hollow stem depending centrally from the bottom thereof, a separate passage extending from the bottom to one side of said member, a screw-threaded side opening, a valve chamber extending from said last opening, a horizontal passage extending therefrom to said bottom stem, and an inclined passage connecting said valve chamber with said hollow top extension, said member being formed with a sharp edged valve seat at the inner end of said valve member, in combination with a nut screwed into said opening in the member, and a beveled valve member within said chamber adapted to engage said sharp edged valve seat, said valve member having an operating stem screw connected with and extending through said nut.

5. In a member having a recessed seat at the bottom, a horizontal valve chamber open at one end formed with a valve seat opposite said open end, a hub at the top of said member, a screw-threaded opening within said hub, an inclined fluid passage connecting said opening of said hub with the said valve chamber between said valve seat and the open end thereof, a hollow stem extending downwardly from said member centrally with respect to said recessed seat thereof, a communicating passage between said valve chamber and said hollow stem axially aligned with said valve seat, a valve member within said valve chamber opposite said valve seat, an operating stem for said valve member, and a supporting nut for said operating stem screwed into said chamber and screw-connected with said operating stem, said operating stem including means to seal the screw-threaded opening of said nut through which said stem extends.

In testimony whereof I affix my signature.

ALBERT J. WEATHERHEAD, Jr.